April 16, 1957　　　W. L. VINSON　　　2,788,802
FLOW CONTROL DEVICE
Original Filed Nov. 4, 1946
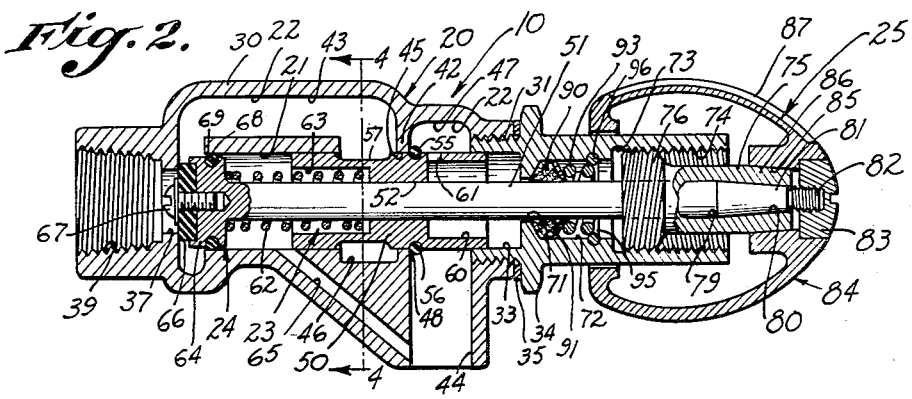
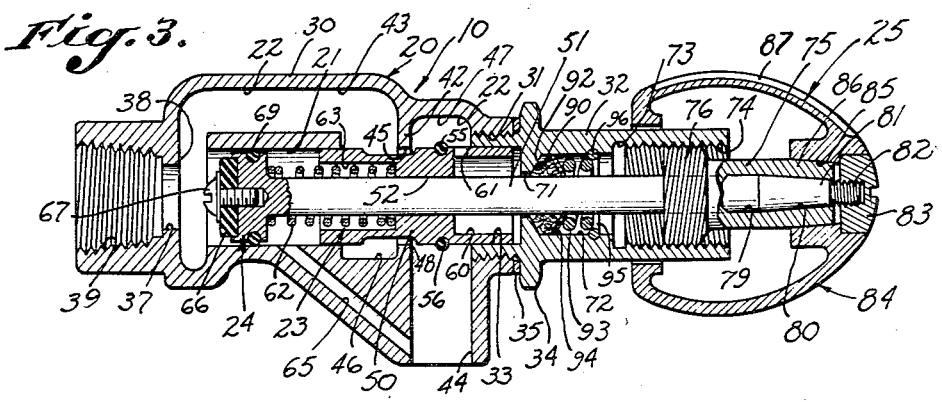
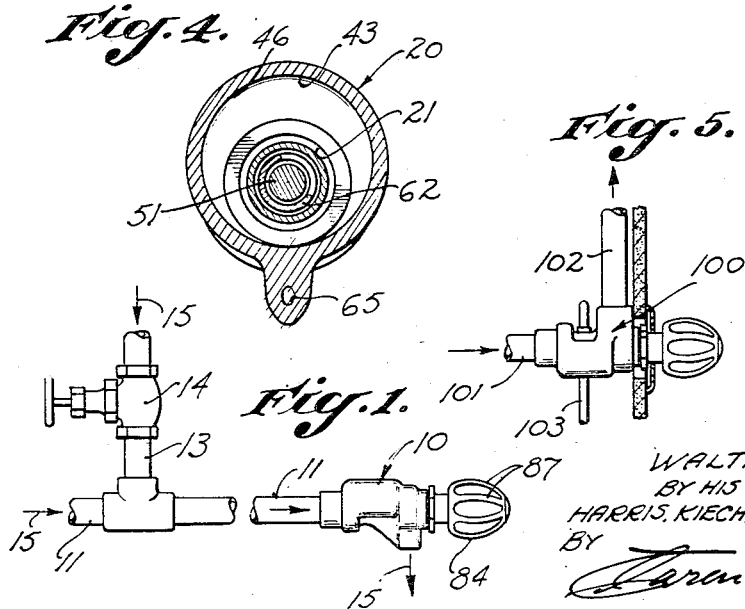
INVENTOR:
WALTER L. VINSON,
BY HIS ATTORNEYS
HARRIS, KIECH, FOSTER & HARRIS,
BY

United States Patent Office 2,788,802
Patented Apr. 16, 1957

2,788,802

FLOW CONTROL DEVICE

Walter L. Vinson, Van Nuys, Calif.; Cleo F. Vinson, executrix of said Walter L. Vinson, deceased Continuation of application Serial No. 707,677, November 4, 1946. This application September 17, 1951, Serial No. 246,967

17 Claims. (Cl. 137—614.19)

My invention relates in general to valves and, more particularly, to a device for maintaining the rate of flow of a fluid substantially constant at any desired value regardless of inlet pressure variations upstream from the device.

The present application is a continuation of my co-pending application Serial No. 707,677, filed November 4, 1946, now abandoned, for Flow Control Device.

A primary object of my invention is the provision of a device of this general character which is adapted to maintain a substantially constant outlet pressure throughout a wide range of inlet pressures so as to maintain the rate of flow of fluid through the device substantially constant at a value commensurate with the outlet pressure.

An important object is to provide a flow control device or valve which is adapted to maintain the rate of flow of a fluid therethrough substantially constant at any of a plurality of predetermined values. A related object is to provide a valve which may be opened or closed in the usual manner to increase or decrease the flow rate and outlet pressure maintained by the valve.

Another object of my invention is to provide a flow control device which automatically compensates for inlet pressure variations by varying the extent of opening of a passage through the device.

A further object is to provide a valve which includes flow control means movable in response to fluid pressure variations for automatically increasing or decreasing the extent of opening of a passage through the valve as the inlet pressure decreases or increases so as to maintain the flow rate and outlet pressure substantially constant.

Still another object is to provide a valve having actuating means for adjusting the flow rate through the valve by moving the flow control means through a rate of operating positions corresponding to various flow rates, the flow control means being movable relative to each of its operating positions in response to pressure variations to maintain the flow rate and outlet pressure substantially constant at values corresponding to the particular operating position occupied thereby.

Another importan object of my invention is to provide a valve of the character described which includes auxiliary valve means for opening and closing the passage though the device independently of the flow control means. When the valve is closed, flow therethrough is prevented by the auxiliary valve means and the flow control means thus need not be relied upon to prevent flow under such conditions. Consequently, since the flow control means is not required to provide a fluid-tight seal, friction between the flow control means and the body of the valve may be minimized so that the flow control means is freely movable in response to pressure variations to provide more sensitive flow regulation, which is an important feature of my invention.

An additional object is to provide a valve wherein the aforesaid actuating means for moving the flow control means through its range of operating positions to adjust the flow rate maintained thereby is also adapted to move the auxiliary valve means between its open and closed positions so that the valve may be opened and closed and the flow rate therethrough increased and decreased by a single actuating means. An important object in this connection is to provide a valve wherein the flow control means substantially prevents flow through the valve until the auxiliary valve means has been moved a predetermined distance from its closed position by the actuating means to minimize any restriction to flow through the valve which may be offered by the auxiliary valve means. Thus, the principal function of the auxiliary valve means is to provide a positive shut-off when the valve is closed, regulation of flow through the valve being accomplished by the flow control means.

The aforesaid actuating means preferably includes an actuating member which is accessible from without the body of the valve and which is threadedly connected to the valve body so that rotation of the actuating member results in longitudinal movement thereof to move the auxiliary valve means between its open and closed positions and to adjust the flow rate maintained by the flow control means.

An important object of my invention in connection with such an actuating means is to provide packing or packing means for providing a fluid-tight seal between the valve body and the actuating member at a point intermediate the passage through the valve body and the threaded connection between the actuating member and the valve body so as to keep fluid in the passage from coming in contact with the threaded connection, this feature being particularly important when the nature of the fluid is such that it may corrode the threads connecting the actuating member to the valve body.

A further object in connection with the actuating means is to provide resilient means for maintaining pressure on the aforesaid packing at all times to compensate for any shrinkage of the packing and for any wear of the components of the valve so that the packing maintains a fluid-tight seal between the actuating member and the valve body for extended periods of time without adjustment.

Another object of my invention is the provision of a valve of the character described which may be installed in any desired fluid line and which may be employed to replace conventional valves or faucets without modification of the fluid lines to which such conventional valves or faucets are connected.

Further objects of my invention include the provision of a flow control valve which is of simple construction and includes a minimum number of parts, and which is economical to manufacture, service and repair.

The foregoing objects of my invention and the advantages suggested thereby, together with various other objects and advantages which will be apparent hereinafter, may be realized by means of the exemplary embodiment which is illustrated in the accompanying drawing and is described in detail hereinafter. Referring to the drawing:

Fig. 1 is a utility view on a reduced scale illustrating one application of a flow control device or valve which embodies the fundamental principles of my invention;

Fig. 2 is a longitudinal sectional view of the valve illustrated in Fig. 1 showing the relative positions of its components when the valve is closed;

Fig. 3 is a view which is similar to Fig. 2 but which shows the components of the valve in the positions occupied thereby when the valve is open;

Fig. 4 is a transverse sectional view which is taken along the line 4—4 of Fig. 2; and Fig. 5 is another utility view, also on a reduced scale, showing another application of a slightly modified embodiment of my flow control device.

In the particular construction illustrated in Fig. 1, my flow control valve, indicated generally by the numeral 10, may take the form of a faucet which is threadedly connected to the end of a fluid supply line or service line 11 in the usual manner. This service line may, for example, form part of a distribution system for water or other fluids which includes one or more branch lines such as the line 13 having a valve 14 therein, flow through the fluid distribution system being indicated by the arrows 15.

It will be apparent that if the valve 10 at the end of of the service line 11 is adjusted to provide a specified rate of flow for a given setting of the valve 14 in the branch line 13, any change in the setting of the valve 14 will produce a pressure change in the service line 11 on the inlet side of the valve 10 tending to change the rate of flow through this valve. As will be discussed in detail hereinafter, the function of the valve 10 is to maintain a substantially constant flow rate regardless of inlet pressure variations arising from changes in the setting of the valve 14, or variations arising from any other cause.

Referring particularly to Figs. 2 and 3, the flow control device 10 includes, in general, a valve body or housing 20 having a valve bore or cylinder or chamber 21 therein and provided with a passage 22 therethrough which communicates with the bore. The device also includes main valve means or flow control means 23 disposed in the cylinder 21 and responsive to fluid pressure variations in the passage 22 for varying the extent of opening of the passage in accordance with such pressure variations so as to maintain the rate of flow through the passage substantially constant at a predetermined value, the flow control means being adjustable to permit varying the flow rate maintained thereby. Manually-operable auxiliary valve means 24 for varying the extent of opening of the passage 22 independently of the flow control means 23 is also disposed in the cylinder 21, the flow control device 10 including means 25 for actuating the auxiliary valve means and for simultaneously adjusting the flow control means to vary the flow rate maintained thereby.

Considering the construction of the flow control valve 10 in more detail with particular reference to Figs. 2 and 3, the valve housing 20 includes a body or body portion 30 having a counterbore 31 therein which is concentric with respect to the cylinder 21, a closure member or gland 32 being threadedly inserted into the counterbore 31 and being provided with a counterbore 33 therein which forms part of the cylinder. The gland 32 is provided with an annular flange 34 thereon which may be of hexagonal cross section to permit the application of a conventional wrench or the like thereto, an annular sealing element or gasket 35 being disposed between the flange 34 and the valve body 30 to provide a fluid-tight seal between the valve body and the gland.

The body 30 is provided with a bore 37 therein which forms part of the passage 22 and which is axially aligned with the bore or cylinder 21, portions of the valve body adjacent the bore 37 forming a seat 38 for the auxiliary valve means 24, the latter being adapted to control the flow of fluid through the bore 37 as will be discussed in more detail hereinafter. The valve body 30 is preferably provided with a threaded counterbore 39 which communicates with the bore 37 and which is adapted to receive an end of a fluid supply line such as the service line 11 therein in the conventional manner.

The valve body 30 is also provided with a wall 42 therein which divides the passage 22 into inlet and outlet passages 43 and 44, the bore 21 extending through the wall to provide an opening 45 interconnecting the inlet and outlet passages. The inlet passage 43 includes an annular portion 46, as best shown in Fig. 4, which communicates with the bore 21 on one side of the wall 42, and the outlet passage 44 includes a similar annular portion 47 which communicates with the bore on the opposite side of the wall. Portions of the wall 42 surrounding the opening 45 therethrough serve as a seat 48 for the main valve means or flow control means 23, the flow control means being adapted to maintain flow through the valve 10 substantially constant in response to pressure variations in the outlet passage 44 as will be discussed in more detail in the following paragraphs.

The flow control means 23 includes a piston or piston-like valve member 50 which is slidably mounted on an actuating member or rod 51 and which is slidably disposed in the cylinder 21. A slight clearance, sufficient to minimize friction, is preferably provided between the piston 50 and the rod 51 and between the piston and the peripheral wall of the bore 21 so that the piston may move freely to provide a more sensitive response to fluid pressure variations as will be discussed later herein. The rod 51 extends through an axial bore 52 in the piston 50 and forms part of the actuating or adjusting means 25 which will be described in more detail hereinafter.

The piston 50 is movable in the bore 21 between closed and open positions as shown in Figs. 2 and 3, respectively, and, when in its closed position, is adapted to engage the valve seat 48 to substantially prevent flow through the opening 45 from the inlet passage 43 to the outlet passage 44. Although the aforesaid clearance between the piston 50 and the peripheral wall of the bore 21 may tend to permit a slight leakage past the piston when it is in its closed position, any such leakage is prevented by the auxiliary valve means 24 when the flow control device 10 is inoperative as will be described hereinafter. In order to provide a fluid-tight seal between the piston 50 and the valve body 30 under certain operating conditions which will be discussed in more detail hereinafter, the piston is provided with an annular groove 55 therein which contains a resilient, annular sealing element or ring 56 of rubber or other suitable material. The ring 56 projects from the groove 55 somewhat and is adapted to engage the valve seat 48 provided by portions of the wall 42 surrounding the opening 45 to provide a fluid-tight seal when the piston 50 is in its closed position as shown in Fig. 2. The ring 56 extends into the annular portion 47 of the outlet passage 44 and does not engage the peripheral wall of the bore 21 so that it does not interfere with the desired free movement of the piston.

The piston 50 is provided with an annular groove or passage 57 therein which is adapted to provide fluid communication between the inlet passage 43 and outlet passage 44 when the piston is disengaged from the valve seat 48 as shown in Fig. 3. The resistance to flow from the inlet passage 43 to the outlet passage 44 offered by the piston 50 decreases as the piston is moved away from its closed position toward a fully open position, thus permitting increasing rates of flow through the device 10. The rate of flow thus depends on the position of the piston 50, the piston being movable through a range of operating positions corresponding to various flow rates. As will be discussed in more detail hereinafter, the piston 50 is movable relative to any of its operating positions in response to pressure variations in the outlet passage 44 so as to maintain the rate of flow through the valve 10 substantially constant at a value corresponding to the particular operating position occupied thereby, and is movable from one of its operating positions to another by the adjusting or actuating means 25 to change the flow rate.

In order to make the flow control means 23 responsive to fluid pressure variations in the outlet passage 44 as previously mentioned, one end of the piston 50 is exposed to fluid pressure in the outlet passage by providing the piston with a counterbore 60 therein which communicates with the outlet passage through one or more openings 61 in the piston and which communicates with the cylinder 21. Thus, fluid entering the outlet passage 44 may flow through the opening 61 and counterbore 60 into the cylinder 21 wherein it acts on the piston 50 and urges it toward its closed position, i. e., toward the left as viewed in Figs. 2 and 3.

The flow control means 23 includes resilient means urging the piston 50 toward its open position in opposition to the action of fluid pressure in the outlet passage 44 thereon, the resilient means preferably comprising a compression spring 62 which encircles the rod 51 and extends into a counterbore 63 in the piston. The spring 62 is adapted to seat against a flange or head 64 which is formed on the rod 51 at a point spaced from the piston 50 and which forms part of the auxiliary valve means 24, the rod being axially movable, as will be discussed in more detail hereinafter, to compress the spring between the head and the piston. The spring 62 thus applies a force to the piston 50 which opposes the force applied thereto by the fluid pressure in the outlet passage 44 so that the piston assumes a position wherein the spring force and fluid pressure force are equal, the magnitude of these forces depending upon the extent of compression of the spring. As will be discussed in more detail hereinafter, the piston 50 is movable in response to slight variations in the force applied thereto by the fluid pressure in the outlet passage 44 so as to maintain this pressure substantially constant at a value commensurate with the extent of compression of the spring 62 by varying the resistance to flow from the inlet passage 43 to the outlet passage.

Since, as previously discussed, slight clearances are preferably provided between the piston 50 and the wall of the cylinder 21 and between the piston and the rod 51 in order to minimize friction, some fluid may leak past the piston into the space between the piston and the head 64 on the rod. Such leakage would tend to increase the fluid pressure in the aforesaid space to augment and vary the force applied to the piston 50 by the spring 62, and, in order to avoid this undesirable result, it is necessary to vent the space between the piston and the head 64 to a substantially constant pressure, which, for convenience may be equal to, or substantially equal to atmospheric. For this purpose the housing 20 is provided with a vent passage 65 which connects the space between the piston 50 and the head 64 on the rod 51 with the outlet passage 44 at a point near the outlet end thereof, the pressure at this point being equal to or perhaps slightly below atmospheric due to the siphoning action of fluid flowing through the outlet passage. The flow control valve 10 is preferably, although not necessarily, mounted in such a position that any fluid leaking into the aforesaid space may drain freely into the outlet passage 44 through the passage 65.

As previously mentioned, the auxiliary valve means 24 is adapted to prevent flow through the valve 10 independently of the flow control means 23, the actuating means 25 being adapted to adjust the flow control means so as to vary the flow rate maintained thereby, and being adapted to move the auxiliary valve means between closed and open positions with respect to the valve seat 38, as shown in Figs. 2 and 3, respectively. The auxiliary valve means 24 includes a valve member 66 which is preferably formed of a material such as rubber, leather, etc., and which is secured to the head 64 by a screw 67, or the like, the valve member 66 being adapted to engage the valve seat 38 to prevent flow through the bore 37. In order to prevent leakage past the head 64 into the cylinder 21, the head is provided with an annular grove 68 therein for an annular sealing element or ring 69 which sealably engages and is slidable relative to the peripheral wall of the cylinder during movement of the auxiliary valve means 24.

Considering the construction of the means 25 for simultaneously actuating the auxiliary valve means 24 and adjusting the flow control means 23, the rod 51 forming part of the means 25 extends from the cylinder 21 through an axial bore 71 and counterbores 72 and 73 in the gland 32. The counterbore 73 is threaded, as indicated at 74, to receive a member 75 which is complementarily threaded as indicated at 76. The member 75 is provided with a bore 79 therethrough, a portion of which is tapered, as indicated at 80, to receive a correspondingly tapered portion 81 of the rod 51. The outer end of the rod 51 is threaded, as indicated at 82, to receive a nut 83 or the like, the latter retaining a knob or handle 84 having a tapered bore 85 therein which receives a tapered end portion 86 of the member 75. The handle 84 is preferably hollow so that it encloses portions of the gland 32, as best shown in Figs. 2 and 3, and is preferably provided with a plurality of longitudinal ribs 87, as best shown in Figs. 1 and 5, to provide convenient grips for the fingers of an operator.

It will be apparent that upon rotation of the handle 84, the threaded connection between the member 75 and the gland 32 will produce axial movement of the rod 51 so as to move the auxiliary valve means 24 toward its open or closed positions, depending upon the direction of rotation of the knob. Such axial movement of the rod 51 will also vary the extent of compression of the spring 62 between the piston 50 and the head 64 on the rod to adjust the flow rate maintained by the flow control means as will be discussed in more detail hereinafter.

In order to prevent leakage or fluid from the cylinder 21 along the rod 51, the flow control valve 10 is provided with packing means 90 which is preferably disposed in the counterbore 72 intermediate the cylinder 21 and the threaded connection between the gland 32 and member 75. This construction keeps fluid in the cylinder 21 from coming in contact with the threads 74 and 76 and thus prevents possible corrosion thereof by the fluid, which is an important feature of the invention.

The packing means 90 includes a body of suitable packing material 91 which encircles the rod 51 and which is seated against a shoulder 92 defined by the bore 71 and counterbore 72. The packing material 91 is constantly retained in engagement with the shoulder 92 and the rod 51 by a spring 93 which encircles the rod and acts on a washer 94 in contact with the packing material, the spring being seated against a snap ring 95 which is disposed in an annular grove 96 in the peripheral wall of the counterbore 72. The spring 93 applies a continuous force to the packing material 91 which retains the packing material in fluid-tight engagement with the shoulder 92, and which tends to compress the packing material so as to retain it in fluid-tight engagement with the rod 51. This construction insures a fluid-tight seal between the rod 51 and gland 32 under all operating conditions and for extended periods of time since the spring 93 may expand or contract to compensate for any differential expansion or contraction of the various parts of the valve 10, and to compensate for any wear of such parts, which is another important feature of the invention.

Considering the operation of my flow control valve 10, the various components thereof normally occupy the positions shown in Fig. 2 when the valve is closed. In order to open the valve 10, it is merely necessary to rotate the handle 84 in the usual manner, whereby the threaded connection between the member 75 and gland 32 produces axial movement of the rod 51 to move the auxiliary valve means 24 away from the valve seat 38 and toward its fully open position. Such movement of the auxiliary valve means 24 is communicated to the piston 50 by the spring 62 and results in movement of the piston toward its fully open position.

As previously mentioned, the principal function of the auxiliary valve means 24 is to prevent flow through the valve 10 when the valve is closed, thus permitting the provision of slight clearances between the piston 50 and the wall of the cylinder 21 and between the piston and the rod 51 to insure free movement of the piston relative thereto. Consequently, in order to avoid restricting the flow through the valve 10 at the auxiliary valve means 24 when the valve is open, the auxiliary valve means is preferably moved a substantial distance from its closed position before the head 64, acting through the spring 62, moves the piston 50 out of its closed position. This result may be accomplished by locating the groove 57 in the piston 50 in such a position that the piston will not disengage the seat 48 until the auxiliary valve means 24 has moved the desired distance from the valve seat 38 as will be apparent from Figs. 2 and 3. As best shown in Fig. 2, the same result may be achieved by making the length of the spring 62 somewhat less than the distance between the head 64 on the rod 51 and the base wall of the counterbore 63 in the piston 50 so as to provide a lost-motion connection between the auxiliary valve means 24 and the piston. Thus, the auxiliary valve means 24 merely prevents flow through the valve 10 when closed, flow through the valve when open being regulated by the flow control means 23 in a manner about to be described.

After the handle 84 has been rotated sufficiently to move the auxiliary valve means 24 a predetermined distance from its closed position, the auxiliary valve means, acting through the spring 62, has moved the piston 50 out of its closed position and into an open or operating position wherein the piston is disengaged from the seat 48 so that fluid may flow from the inlet passage 43 through the groove 57 and into the outlet passage 44. The pressure of the fluid in the outlet passage 44 is communicated to one end of the piston 50 through the opening 61 therein and tends to move the piston toward its closed position, which tendency is opposed by the spring 62. The spring is thus compressed between the piston 50 and the head 64 on the rod 51 until the piston assumes a position such that the forces applied thereto by the spring and by the fluid in the outlet passage 44 are equal.

If the pressure in the inlet passage 43 increases for any reason, such an increase results in a pressure rise in the outlet passage 44 which displaces the piston 50 toward its closed position to arrest any further pressure rise in the outlet passage by increasing the resistance to flow from the inlet passage to the outlet passage, the pressure rise experienced in the outlet passage being equal only to that required to compress the spring 62 an amount sufficient to increase the flow resistance offered by the piston to the higher value. Similarly, if the pressure in the inlet passage 43 decreases for any reason, the pressure in the outlet passage 44 also decreases so that the spring 62 moves the piston 50 toward its open position so as to arrest any further pressure loss in the outlet passage by lessening the resistance to flow offered by the piston, the pressure loss occurring in the outlet passage being equal only to that required to permit the spring 62 to expand an amount sufficient to provide the reduced flow resistance. Thus, the piston 50 constantly seeks a position such that the forces applied thereto by the spring 62 and by the fluid in the outlet passage 44 are equal, and, in so doing, maintains the pressure in the outlet passage at a value proportional to the spring force.

Consequently, if the spring force remains substantially constant during displacement of the piston 50 relative to a given operating position in response to fluid pressure variations, the piston will maintain the pressure in the outlet passage 44 and, consequently, the rate of flow through the valve 10, substantially constant. The spring force may be maintained substantially constant by employing a piston which produces substantial changes in flow resistance for small displacements of the piston, and/or by employing a spring having a spring constant such that the displacements of the piston do not change the spring force appreciably.

In order to increase or decrease the rate of flow maintained by the flow control means 23 in the foregoing manner, it is merely necessary to vary the extent to which the spring 62 is compressed between the piston 50 and the head 64 on the rod 51 by rotating the handle 84, thus varying the spring force applied to the piston. Since the pressure in the outlet passage 44 and the flow rate through the device 10 are dependent upon the spring force applied to the piston 50 as previously discussed, changing the spring force applied to the piston by varying the position of the head 64 on the rod 51 will change the outlet pressure and flow rate maintained by the device.

Although my invention takes the form of a faucet which may be connected to the end of a fluid supply line such as the service line 11 in the embodiment shown in Figs. 1 to 4, my flow control device may also be installed at any desired point in a fluid supply line. Referring to Fig. 5, I show a slightly modified form of my flow control device which is indicated by the numeral 100 and to which are connected inlet and outlet lines 101 and 102, respectively, the device 100 being adapted to control the rate at which fluid is delivered at a point removed therefrom. The principal differences between the modified device 100 and the device 100 previously described are that the outer end of the outlet passage 44 is internally threaded (not shown) to receive the outlet line 102, and the space between the piston 50 and the head 64 on the rod 51 is vented to the atmosphere, or other constant pressure, by means of a tube 103.

In the event that an increase in fluid pressure occurs in the outlet passage 44 as a result of a stoppage of flow through the outlet passage, as, for example, when a valve (not shown) in the outlet line 102 of Fig. 5 is closed, such a pressure increase in the outlet passage causes the piston to move into its fully closed position until the sealing element 56 engages the seat 48 to prevent any further pressure increase. If the aforesaid valve in the outlet line 102 is subsequently opened, the pressure in the outlet passage 44 decreases due to the escape of fluid therefrom and the piston 50 will gradually move away from its closed position until it reaches an open position sufficient to maintain the outlet pressure and flow rate at the proper values. This action of the sealing element 56 is of particular utility in the event that a garden hose, for example (not shown), is connected to the outlet side of the valve 10 since the sealing element will prevent the development of excessive and possibly damaging pressures in the hose in the event that a spray nozzle or the like at the end thereof is closed.

My invention thus provides a simple and efficient means for maintaining the rate of flow of a fluid substantially constant at any one of a plurality of values. My flow control device is of relatively simple construction and may be assembled readily during manufacture, or may be disassembled and reassembled readily whenever servicing or repair thereof is necessary. For example, if it should become necessary to service any of the components of the flow control means 23 or auxiliary valve means 24, such components are made readily accessible by unscrewing the gland 32 and withdrawing the flow control means and auxiliary valve means from the bore 21.

Although I have disclosed preferred forms of my invention herein, I do not desire to be limited thereto since various changes, modifications and substitutions may be incorporated in the embodiments disclosed without departing from the spirit of the invention. Consequently, I hereby reserve the right to all such changes, modifications and substitutions as properly come within the scope of my invention as set forth in the appended claims.

I claim as my invention:

1. In a flow control device, the combination of: means providing a passage for a fluid; valve means movable in said passage between closed and open positions for varying the extent of opening of said passage; flow control means in said passage and movable relative to any one of a plurality of operating positions in response to pressure variations in said passage for maintaining the rate of flow of fluid through said passage substantially constant at one of a plurality of predetermined values corresponding to said operating positions; motion-transmitting means providing a lost-motion connection, including engageable and disengageable elements, between said flow control means and said valve means for moving said flow control means from one to another of said operating positions after an initial movement of said valve means toward said open position so as to change the flow rate through said passage from one to another of said predetermined values, said motion-transmitting means including resilient means for biasing said flow control means toward an open position, said lost-motion connection causing said flow control means to maintain a flow rate through said passage which is substantially equal to zero until said valve means has been moved a predetermined distance from said closed position toward said open position; and actuating means for moving said valve means.

2. In a device for controlling the rate of flow of a fluid, the combination of: a housing having a passage therethrough for the fluid; valve means in said housing movable between closed and open positions for varying the extent of opening of said passage; resilient means; means in said housing operatively and floatingly connected to said valve means solely by said resilient means and movable relative to any one of a plurality of operating positions in response to pressure variations in said passage for maintaining the rate of flow of the fluid through said passage substantially constant at one of a plurality of predetermined values corresponding to said operating positions, said pressure responsive means being movable by said resilient means from one to another of said operating positions during movement of said valve means toward said open position so as to change the rate at which flow of the fluid through said passage is maintained by said pressure responsive means from one to another of said predetermined values, said resilient means interconnecting said pressure responsive means and said valve means, there being a lost-motion connection, including engageable and disengageable elements, between said resilient means and one of said valve means and said pressure responsive means so that initial opening movement of said valve means does not result in movement of said pressure responsive means, whereby said pressure responsive means maintains a flow rate substantially equal to zero until said valve means has been moved a predetermined distance from said closed position; and means for moving said valve means.

3. In a device for controlling the rate of flow of a fluid, the combination of: a housing having a passage therethrough for the fluid; valve means in said housing movable between closed and open positions for varying the extent of opening of said passage; resilient means; flow control means movable relative to any of a plurality of operating positions in response to fluid pressure variations in said passage and movable through a range of such operating positions corresponding to various predetermined rates of flow of the fluid through said passage for maintaining flow of the fluid through said passage substantially constant at any of said predetermined rates depending upon the particular operating position occupied thereby, said flow control means being operatively and floatingly connected to said valve means solely by said resilient means so as to be movable therewith through said range of operating positions during at least a portion of any movement of said valve means from said closed position toward said open position, there being a lost-motion connection, including engageable and disengageable elements, between said resilient means and one of said flow control means and said valve means so that initial opening movement of said valve means does not produce movement of said flow control means; and a movable actuating member connected to said valve means and extending outwardly through said housing for moving said valve means between said closed and open positions.

4. A flow control device according to claim 3 wherein said actuating member is rotatable relative to said housing and is threadedly connected thereto so that rotation of said actuating member results in movement thereof along its axis of rotation to move said valve means between said closed and open positions, said flow control device including packing means engaging said housing and said actuating member for providing a fluid-tight seal therebetween, said packing means engaging said housing and said actuating member at a location intermediate said passage and the threaded connection between said housing and said actuating member whereby to prevent fluid in said passage from coming in contact with said threaded connection.

5. In a device for controlling the rate of flow of a fluid, the combination of: a housing provided with a passage therethrough for the fluid; flow control means movable relative to said passage between open and closed positions for varying the extent of opening of said passage at a predetermined point therein, said flow control means having a surface which faces in the same direction as the direction of movement of said flow control means toward said open position and which is exposed to fluid pressure in said passage, whereby said flow control means is urgeable toward said closed position by the action of said fluid pressure on said surface thereof; resilient means for urging said flow control means toward said open position in opposition to the action of said fluid pressure on said surface thereof; adjusting means providing a seat for said resilient means for varying the force applied to said flow control means by said resilient means, said resilient means providing the sole operative connection between said flow control means and said adjusting means, and said resilient means providing a lost-motion connection between said adjusting means and said flow control means so that said adjusting means is adapted to move a predetermined distance before increasing the force applied to said flow control means by said resilient means sufficiently to displace said flow control means from its closed position, there being a lost-motion connection, including engageable and disengageable elements, between said resilient means and one of said adjusting means and said flow control means so that said adjusting means is adapted to move a predetermined distance before a force is applied to said flow control means through said resilient means to displace said flow control means from its closed position; and valve means on said adjusting means and movable relative to said passage between open and closed positions for varying the extent of opening of said passage at another point spaced from said predetermined point therein, said adjusting means being adapted to simultaneously move said valve means toward said open position thereof and to increase the force applied to said flow control means by said resilient means so as to urge said flow control means toward its open position during such movement of said valve means toward its open position.

6. In a fluid flow control device, the combination of: a housing provided with inlet and outlet passages therein for the fluid and provided with a bore therein communicating with said inlet and outlet passages; a piston slidable in said bore between closed and open positions, said piston being adapted to provide fluid communication between said inlet and outlet passages when in said open position and to substantially prevent fluid communication therebetween when in said closed position, said piston having an end which faces in the same direction as the direction of movement of said piston toward said open position, and which is exposed to fluid pressure in said outlet passage, whereby said piston is urgeable toward said closed position by the action of said fluid pressure on said end thereof; a compression spring adapted to engage the opposite end of said piston so as to oppose the action of said fluid pressure in said outlet passage on said end of said piston; a seat for said spring, said seat being movable axially of said bore toward and away from said piston so as to vary the force applied to said piston by said spring; a drain passage in said housing and communicating with said bore between said piston and said spring seat; a valve seat encircling one of said passages; a valve member operatively connected to and movable with said spring seat between open and closed positions with respect to said valve seat, said valve member being movable toward its open position during movement of said spring seat toward said piston; and means for moving said spring seat.

7. In a fluid flow control device, the combination of: a housing provided with inlet and outlet passages therein for the fluid and provided with a bore therein communicating with said passages; a valve seat aligned with said bore and encircling one of said passages; a piston reciprocable in said bore between open and closed positions, said piston being adapted to substantially prevent fluid flow from said inlet passage to said outlet passage when in said closed position and having a passage therein which is adapted to provide communication between said passages when said piston is in said open position, said piston having an end which faces in the same direction as the direction of movement of said piston toward said open position, and which is exposed to fluid pressure in said outlet passage, whereby said piston is urgeable toward said closed position by the action of said fluid pressure on said end thereof; valve means movable axially of said bore between closed and open positions with respect to said valve seat; a compression spring disposed between said valve means and said piston, said spring being adapted to urge said piston toward its open position in opposition to the action of said fluid pressure in said outlet passage on said end of said piston, said valve means being adapted to compress said spring during movement toward said open position thereof so as to increase the spring force urging said piston toward its open position and being adapted to permit expansion of said spring during movement toward said closed position thereof so as to decrease the spring force urging said piston toward its open position; a drain passage in said housing and communicating with said bore between said piston and said valve means; and means for moving said valve means between said closed and open positions thereof.

8. In a fluid flow control device, the combination of: a housing provided with inlet and outlet passages therein for the fluid and provided with a bore therein communicating with said passages; a valve seat aligned with said bore and encircling one of said passages; valve means movable in said bore between closed and open positions with respect to said valve seat; means providing a fluid-tight seal between said valve means and the peripheral wall of said bore; a rod connected to said valve means and extending axially of said bore; a piston reciprocable in said bore between open and closed positions, said piston having an end which is spaced from said valve means and being provided with an axial opening therethrough in which said rod is slidably disposed, the opposite end of said piston facing in the same direction as the direction of movement of said piston toward its open position and being exposed to fluid pressure in said outlet passage, whereby said piston is urgeable toward its closed position by said fluid pressure on said opposite end of said piston, said piston, when in its closed position, being adapted to substantially prevent flow from said inlet passage to said outlet passage, and, when in its open position, being adapted to permit such flow; a compression spring encircling said rod between said piston and said valve means, said spring, when compressed between said piston and said valve means, being adapted to urge said piston toward its open position in opposition to the action of said fluid pressure in said outlet passage on said opposite end of said piston; a drain passage in said housing communicating with said bore between said piston and said valve means; and means for moving said rod axially of said bore so as to move said valve means either toward or away from its closed position whereby to decrease or increase, respectively, the extent of compression of said spring, said valve means being adapted to compress said spring sufficiently to move said piston out of its closed position after said valve means has been moved a predetermined distance from its closed position.

9. In a device of the character described, the combination of: a cylinder provided with inlet and outlet passages therein which communicate with the interior thereof; a piston-like valve member reciprocable in said cylinder between a closed position wherein it substantially prevents fluid communication between said passages and an open position wherein it provides fluid communication therebetween, said valve member having an end which faces in the same direction as the direction of movement of said valve member toward its open position, and which is exposed to fluid pressure in said outlet passage, said fluid pressure acting on said end of said valve member tending to urge said valve member toward its closed position; a spring seat movable axially of said cylinder and spaced from the opposite end of said valve member; a compression spring between said spring seat and said valve member, said spring, when compressed between said spring seat and said valve member, being adapted to urge said valve member toward its open position in opposition to the action of said fluid pressure in said outlet passage on said end of said valve member; a drain passage communicating with said cylinder between said spring seat and said valve member; a valve seat encircling one of said passages; an auxiliary valve member movable between closed and open positions with respect to said valve seat; actuating means for moving said spring seat toward and away from said piston-like valve member to vary the extent of compression of said spring therebetween; and means operatively connecting said actuating means and said auxiliary valve member for moving said auxiliary valve member toward and away from its open position during respective movement of said spring seat toward and away from said piston-like valve member, said actuating means being adapted to move said auxiliary valve member a predetermined distance from its closed position before said spring is compressed sufficiently by corresponding movement of said spring seat toward said piston-like valve member to move said piston-like valve member out of its closed position.

10. In a flow control device, the combination of: a valve body having a bore therein and having inlet and outlet passages which communicate with said bore at points spaced apart axially of said bore, said valve body providing a valve seat which encircles said bore between said points at which said inlet and outlet passages communicate with said bore; a piston valve disposed in said bore and having a circumferential portion which is adapted to engage said valve seat to prevent flow from said inlet passage to said outlet passage, said piston valve having a channel therein adjacent said circumferential portion thereof which is adapted to register with said valve seat to permit flow past said valve seat from said inlet passage to said outlet passage by way of said channel, said piston valve being axially slidable in said bore from a closed position wherein said circumferential portion thereof engages said valve seat to an open position wherein said channel registers with said valve seat, said piston valve having a transverse area which faces in the same direction as the direction of movement of said piston valve toward its said open position and which is in fluid communication with said outlet passage so that fluid pressure in said outlet passage acts on said transverse area to bias said piston valve toward its said closed position, and said piston valve having a first spring seat which faces in the same direction as the direction of movement of said piston valve toward its said closed position; a second spring seat in said valve body axially aligned with and facing said first spring seat; a compression spring disposed between and adapted to engage said spring seats for biasing said piston valve toward said open position in opposition to the action of fluid pressure in said outlet passage on said transverse area of said piston valve; and a drain passage communicating with said bore between said spring seats.

11. In a flow control device, the combination of: a valve body having a valve chamber therein and having inlet and outlet passages which communicate with said chamber at points spaced apart axially of said chamber, there being a valve seat between said points; a valve disposed in said chamber and having a circumferential portion which is adapted to engage said valve seat to prevent flow from said inlet passage to said outlet passage, said valve having a channel therein adjacent said circumferential portion thereof which is adapted to register with said valve seat to permit flow past said valve seat from said inlet passage to said outlet passage by way of said channel, said valve being axially movable in said chamber from a closed position wherein said circumferential portion thereof engages said valve seat to an open position wherein said channel registers with said valve seat, said valve having a transverse area which faces in the same direction as the direction of movement of said valve toward its said open position and which faces said point of communication of one of said passages with said chamber so that said transverse area is in fluid communication with said one passage, whereby fluid pressure in said one passage acts on said transverse area to bias said valve toward its said closed position, and said valve having a first spring seat which faces in the same direction as the direction of movement of said valve toward its said closed position; a second spring seat in said valve body axially aligned with and facing said first spring seat; a compression spring disposed between and adapted to engage said spring seats for biasing said valve toward its said open position in opposition to the action of fluid pressure in said one passage on said transverse area of said valve; and a drain passage communicating with said chamber between said spring seats.

12. A flow control device as defined in claim 11 wherein said second spring seat is movable relative to said valve body in a direction axially of said chamber to vary the spring force applied to said valve by said compression spring, said device including adjusting means connected to said second spring seat for so moving same.

13. In a flow control device, the combination of: a valve body having a valve chamber therein and having inlet and outlet passages which communicate with said chamber at points spaced apart axially of said chamber, there being a partition between said points; a valve disposed in said chamber and having a circumferential portion which is adapted to engage one side of said partition to prevent flow from said inlet passage to said outlet passage, said valve having a channel therein adjacent said circumferential portion thereof which is adapted to register with said partition to permit flow past said partition from said inlet passage to said outlet passage by way of said channel, said valve being axially movable in said chamber from a closed position wherein said circumferential portion thereof engages said one side of said partition to an open position wherein said channel registers with said partition, said valve having a transverse area which faces in the same direction as the direction of movement of said valve toward its said open position and which is in fluid communication with that one of said passages which is on said one side of said partition so that fluid pressure in said one passage acts on said transverse area to bias said valve toward its said closed position, and said valve having a first spring seat which faces in the same direction as the direction of movement of said valve toward its said closed position; a second spring seat in said valve body axially aligned with and facing said first spring seat; and a compression spring disposed between and adapted to engage said spring seats for biasing said valve toward its said open position in opposition to the action of fluid pressure in said one passage on said transverse area of said valve.

14. In a flow control device, the combination of: a housing providing a passage; a valve seat encompassing said passage; a valve member movable between a closed position wherein it engages said seat and an open position wherein it is disengaged therefrom, said valve member having a surface on one side thereof which faces in the direction of movement of said valve member toward its open position and which is exposed to fluid pressure in said passage so that said valve member is biased toward its closed position by the action of fluid pressure in said passage on said surface thereof, said valve member having another surface on the opposite side thereof which faces in the opposite direction; adjustable resilient means in a chamber in said housing and engaging said opposite side of said valve member for biasing said valve member toward its open position in opposition to the action of fluid pressure on the first-mentioned surface thereof, said other surface of said valve member being exposed to said chamber, and said housing providing a vent passage connecting said chamber to the atmosphere to drain said chamber and to expose said other surface of said valve member to atmospheric pressure; and adjusting means operatively connected to said resilient means for adjusting same to vary the bias applied to said valve member by said resilient means, said resilient means being the sole operative connection between said valve member and said adjusting means.

15. In a flow control device, the combination of: a valve body having a valve chamber therein and having inlet and outlet passages which communicate with said chamber at points spaced apart axially of said chamber, there being a partition between said points; a valve disposed in said chamber and having a circumferential portion which is adapted to engage one side of said partition to prevent flow from said inlet passage to said outlet passage, said valve having a channel therein adjacent said circumferential portion thereof which is adapted to register with said partition to permit flow past said partition from said inlet passage to said outlet passage by way of said channel, said valve being axially movable in said chamber from a closed position wherein said circumferential portion thereof engages said one side of said partition to an open position wherein said channel registers with said valve seat, said valve having a transverse area which faces in the same direction as the direction of movement of said valve toward its said open position and which is in fluid communication with that one of said passages which is on said one side of said partition so that fluid pressure in said one passage acts on said traverse area to bias said valve toward its said closed position, and said valve having a first spring seat which faces in the same direction as the direction of movement of said valve toward its said closed position; a second spring seat in said valve body axially aligned with and facing said first spring seat; a compression spring disposed between and adapted to engage said spring seats for biasing said valve toward its said open position in opposition to the action of fluid pressure in said one passage on said transverse area of said valve; and adjusting means connected to said second spring seat for moving same axially of said chamber to vary the spring force applied to said valve by said compression spring.

16. A flow control device as defined in claim 11 wherein said circumferential portion of said valve is formed of resilient sealing material.

17. A flow control device as defined in claim 11 wherein at least a portion of one of said passages extends along side said chamber.

(References on following page)

References Cited in the file of this patent

UNITED STATES PATENTS

| | | |
|---|---|---|
| 208,986 | Patterson | Oct. 15, 1878 |
| 616,730 | Raynolds | Dec. 27, 1898 |
| 1,144,758 | Desmond | June 29, 1915 |
| 1,291,183 | Schulder | Jan. 14, 1919 |
| 1,387,991 | Kunke | Aug. 16, 1921 |
| 1,876,246 | King | Sept. 6, 1932 |
| 1,954,662 | Bond | Apr. 10, 1934 |
| 2,303,175 | Russell | Nov. 24, 1942 |
| 2,336,282 | Mueller | Dec. 7, 1943 |